US008364393B2

(12) United States Patent
DeLuca et al.

(10) Patent No.: US 8,364,393 B2
(45) Date of Patent: Jan. 29, 2013

(54) INFORMATION TECHNOLOGY FOR FINDING A LOCATION BASED ON AN IMAGE AT ANOTHER LOCATION

(75) Inventors: Lisa Seacat DeLuca, San Francisco, CA (US); Travis M. Grigsby, Austin, TX (US); Frank Lawrence Jania, Durham, NC (US); Steven Michael Miller, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/511,417

(22) Filed: Jul. 29, 2009

(65) Prior Publication Data

US 2011/0029226 A1 Feb. 3, 2011

(51) Int. Cl.
*G01C 21/30* (2006.01)
(52) U.S. Cl. .................. 701/409; 701/410; 701/461
(58) Field of Classification Search .......... 701/207–213, 701/408–410, 420, 431, 436, 450, 451, 461; 340/990–994, 995.1–995.28; 348/231.2, 348/113, 116; 382/100, 305, 217, 218
See application file for complete search history.

(56) References Cited

U.S. PATENT DOCUMENTS

| | | | |
|---|---|---|---|
| 6,850,209 B2 | 2/2005 | Mankins | |
| 7,376,696 B2 * | 5/2008 | Bell et al. | 709/203 |
| 7,426,532 B2 * | 9/2008 | Bell et al. | 709/201 |
| 7,995,055 B1 * | 8/2011 | Ma et al. | 345/420 |
| 8,072,448 B2 * | 12/2011 | Zhu et al. | 345/419 |
| 8,131,118 B1 * | 3/2012 | Jing et al. | 382/305 |
| 8,138,930 B1 * | 3/2012 | Heath | 340/601 |
| 2007/0260393 A1 * | 11/2007 | Abernethy et al. | 701/201 |
| 2008/0002916 A1 * | 1/2008 | Vincent et al. | 382/305 |
| 2008/0147730 A1 * | 6/2008 | Lee et al. | 707/104.1 |
| 2008/0201734 A1 | 8/2008 | Lyon | |
| 2008/0259096 A1 | 10/2008 | Huston | |
| 2009/0169115 A1 * | 7/2009 | Hu et al. | 382/209 |
| 2010/0302027 A1 * | 12/2010 | Gold | 340/539.2 |

FOREIGN PATENT DOCUMENTS

| WO | 2008139566 A1 | 11/2008 |
|---|---|---|
| WO | 2009/006722 A1 | 1/2009 |

OTHER PUBLICATIONS

Hac, Anna, Location update and routing scheme for a mobile computing environment, International Journal of Network Management, 2000; 10:191-214.

Ofstad, Andrew, AAMPL: Accelerometer Augmented Mobile Phone Localization, MELT'08, Sep. 19, 2008, San Francisco, CA, US, ACM 978-1-60558-189—Jul. 8, 2009.

Cho, Junghoo, Stanford WebBase Components and Applications, ACM Transactions on Internet Technology, vol. 6, No. 2, May 2006, pp. 153-186.

* cited by examiner

*Primary Examiner* — Richard M. Camby
(74) *Attorney, Agent, or Firm* — Anthony V. S. England; Doug H. Lefeve (57) ABSTRACT

A computer system displays an image of a first geographic location by a computer system, receives a user selection of a portion of the image of the first geographic location, processes the user-selected image portion to identify a meaning for the user-selected image portion, computes a logical connection between the computer system identified meaning and a second geographic location, and directs the user to the second geographic location. Computing the logical connection may include finding a match between a significance of the second geographic location and the meaning identified for the user-selected image portion. Receiving a user selection of an image portion may include receiving a user selection identifying an ad within the image and wherein the processing to identify a meaning for the user-selected image portion includes identifying a meaning for the ad.

25 Claims, 8 Drawing Sheets

INFORMATION TECHNOLOGY FOR FINDING A LOCATION BASED ON AN IMAGE AT ANOTHER LOCATION

BACKGROUND

The present invention relates to images for exploring or navigating geographic locations.

In recent years, panoramic street-level images have become widely available for free to the public over the Internet via services such as Google StreetView, Mapjack, and Everyscape, for example. This kind of service enables users to explore street-level images of places, which users may do simply out of curiosity or in order to learn about the places, find points of interest, decide whether to physically go there in real life, bodily navigate the real places, etc.

Advertisements on web pages are sometimes presented to a user in association with images, wherein an ad is commonly generated or retrieved by a computer and added to an image by the computer. Sometimes the computer selects the ad responsive to the web page in which the image appears, a tag associated with the image, or information about the user.

SUMMARY OF THE INVENTION

A computer system displays an image of a first geographic location, receives a user selection of a portion of the image of the first geographic location, processes the user-selected image portion to identify a meaning for the user-selected image portion, computes a logical connection between the identified meaning and a second geographic location, and directs the user to the second geographic location. In one feature, computing the logical connection includes finding a match between a significance of the second geographic location and the meaning identified for the user-selected image portion. In another feature, receiving a user selection of an image portion includes receiving a user selection identifying an ad within the image and wherein the processing to identify a meaning for the user-selected image portion includes identifying a meaning for the ad.

In another aspect, processing the image to identify a meaning for the ad may include the computer system's recognizing text in the user selected image portion and computing the logical connection between the user-selected ad and the second geographic location includes the computer system's searching a database for commercial outlets relating to the recognized text and searching among the commercial outlets relating to the recognized text for one located nearest to the first location.

In another aspect, the processing to identify a meaning for the ad includes the computer system's identifying an object in the user selected image portion, searching for a matching description of the object in a database, and identifying text for the matching description responsive to the searching. Computing the logical connection includes the computer system's searching a database for commercial outlets relating to the identified text and searching among the commercial outlets relating to the identified text for one located nearest to the first location.

In another aspect, the second geographic location includes a retail outlet, wherein the logical connection includes a connection wherein the outlet sells goods or services corresponding to the ad.

In another aspect, selling goods or services corresponding to the ad includes selling goods or services from a source associated with a trademark in the ad.

In another aspect, directing the user to the second geographic location includes identifying the second geographic location on a map.

In another aspect, directing the user to the second geographic location includes providing a text-based description of a route from the first geographic location to the second geographic location.

In another aspect, directing the user to the second geographic location includes graphically showing a route on a map from the first location to the second geographic location.

In another aspect, the image includes a panoramic street-level image of city street surroundings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
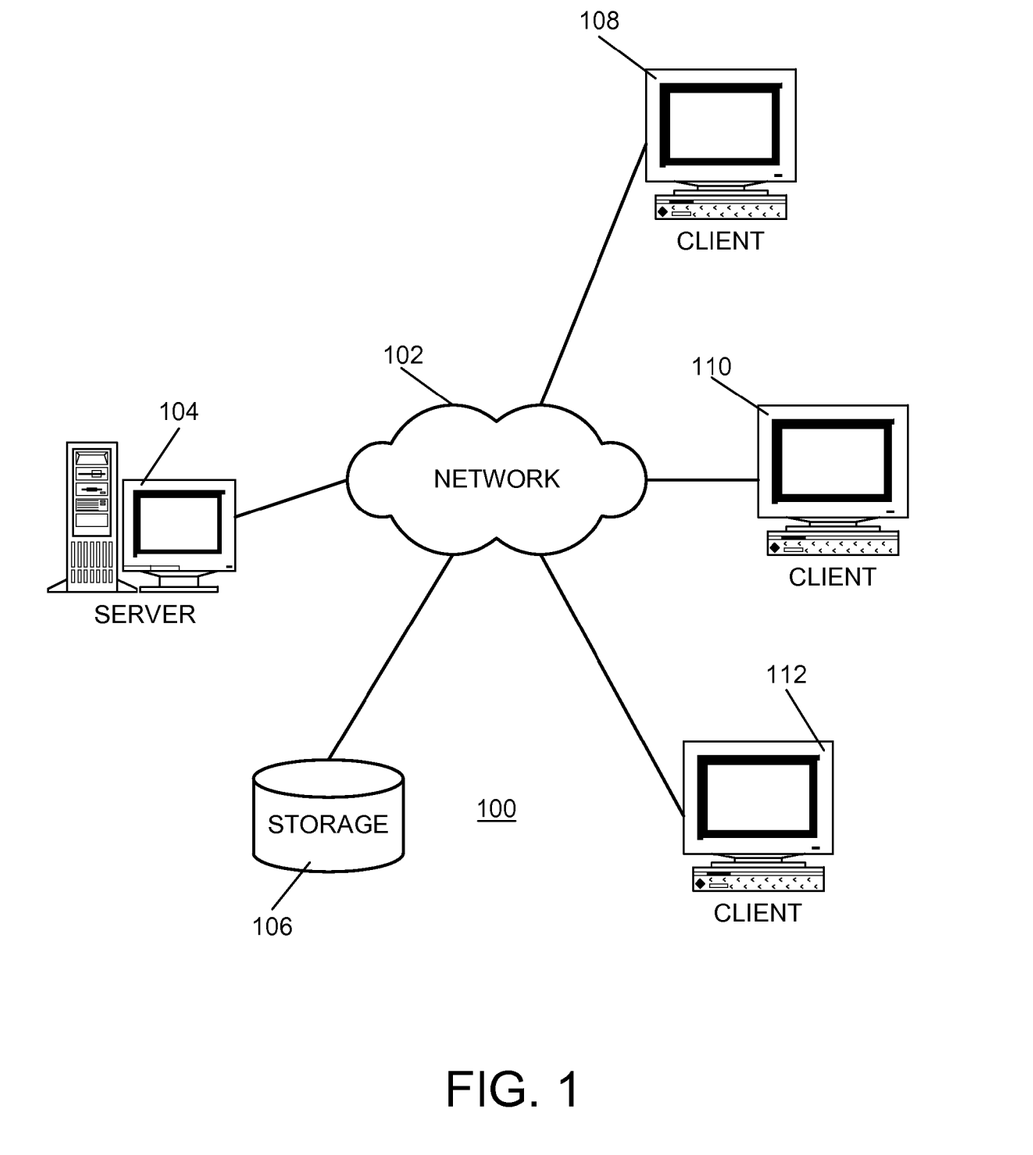
FIG. 1 is an exemplary block diagram illustrating a distributed data processing system according to an embodiment of the invention.

With reference now to the figures, FIG. 1 depicts a pictorial representation of a network data processing system 100 in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
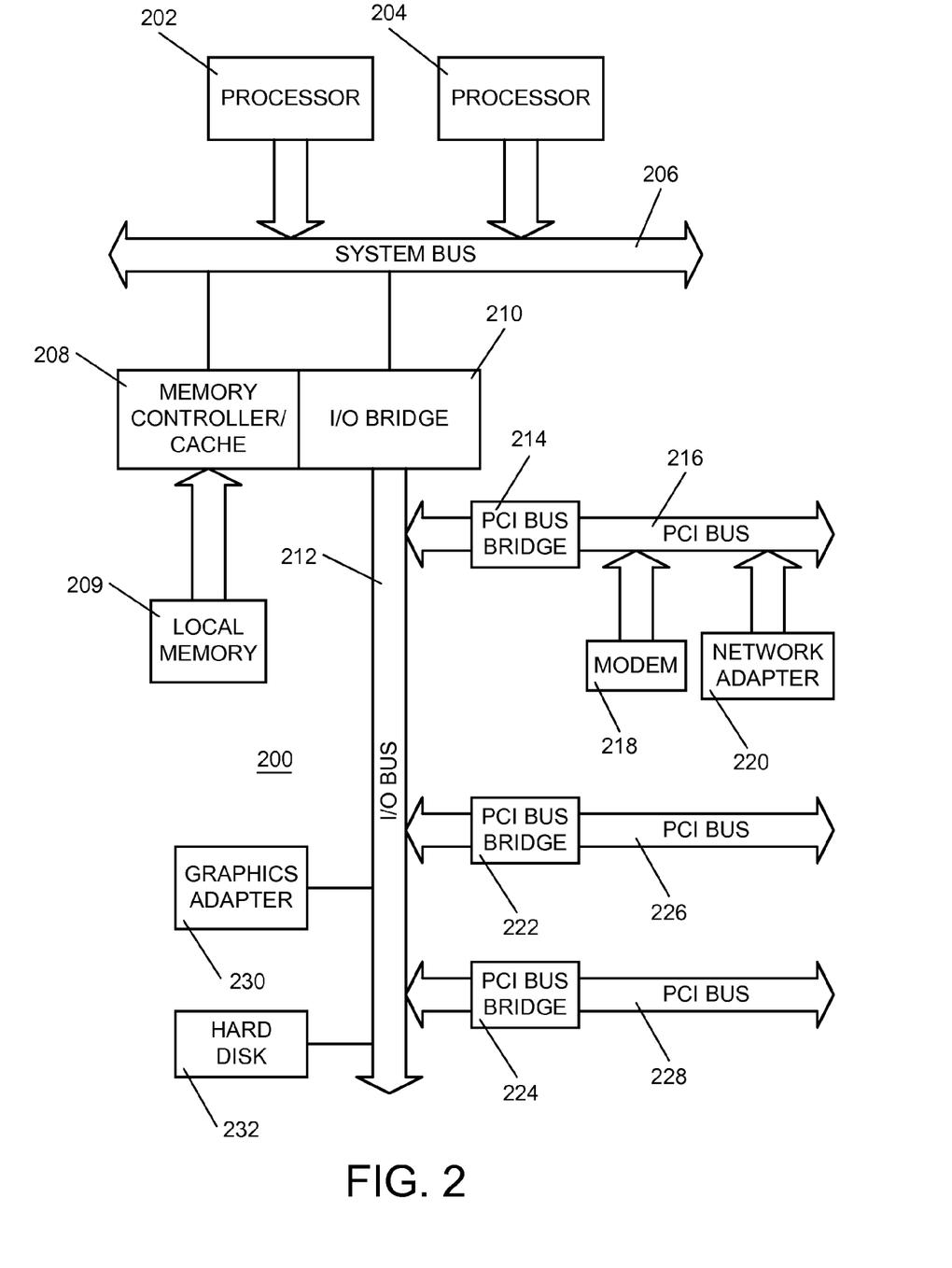
FIG. 2 is an exemplary block diagram of a server apparatus according to an embodiment of the invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
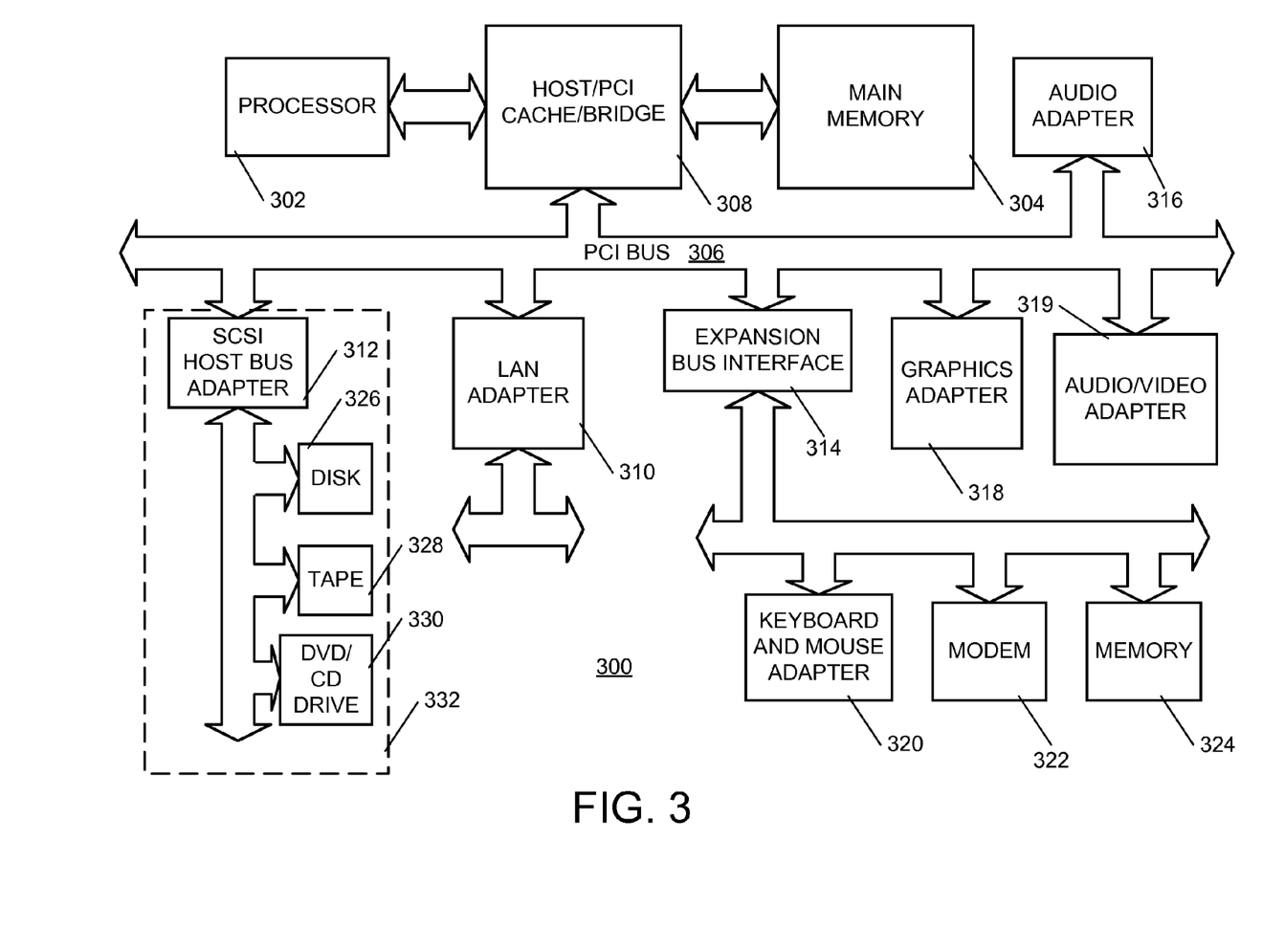
FIG. 3 is an exemplary block diagram of a client apparatus according to an embodiment of the invention.

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

The invention is preferably local to any one, a few or all of the clients 108, 110 and 112. Nonetheless, the invention may reside on server 104, especially when the server 104 is the computer system that generates the digital image instead of just passing map data to a requesting client. Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

As will be appreciated by one skilled in the art, aspects of the present invention may be embodied as a system, method or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and program products according to embodiments of the invention. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. Common database products that may be used to implement the databases include DB2 by IBM (Armonk, N.Y.), any of the database products available from Oracle Corporation (Redwood Shores, Calif.), Microsoft Access by Microsoft Corporation (Redmond, Wash.), or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM Websphere Internet tools suite, an IBM DB2-UDB database platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

The flowchart and block diagrams in the Figures illustrate the architecture, functionality, and operation of possible implementations of systems, methods and program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that, although the invention is shown to be used in conjunction with a conventional computer system (i.e., clients 108, 110, 112 and server 104), the invention can easily be used by any handheld device (i.e., cellular telephones, PDAs etc.) so long as the handheld system has the ability to display digital maps or images.

According to an embodiment of the present invention, a user operating a computer views an image of a real-world geographic location via a browser of the computer. This may be done using Google Streetview or other applications. The image shows that an advertisement exists on a sign at the location. The user selects an area of the image containing the advertisement and indicates he'd like to know what physical location is associated with that advertisement. For example, the advertisement may be for a restaurant chain and the user selection is because the user wants to know a nearby location of one of the restaurants in the chain. The computer performs a search centered on the location of the sign and returns the restaurant location, which may include a route to the location from the location of the sign.

Figure 4A:
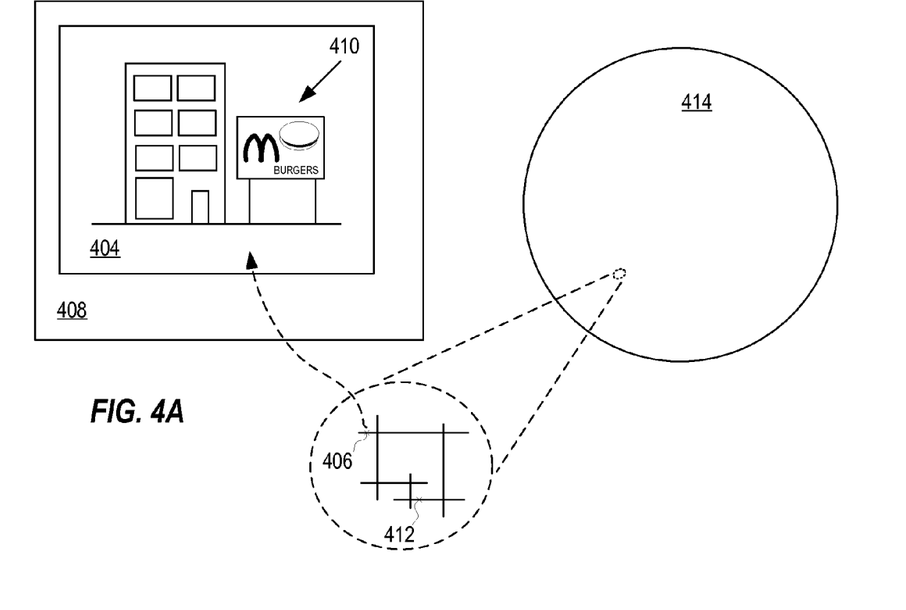
FIG. 4A depicts a computer system presenting a user an image of a first real-world location and otherwise interacting with the user to enable exploring or navigating, according to an embodiment of the invention.

The above described embodiment of the present invention and others may be better understood by reference to FIG. 4A, in which a user is shown exploring or navigating real-world locations, according to an embodiment of the invention. Herein, in one instance a user is viewing image 404 of first place 406 (i.e., a geographic location) on a web page in a street-level view via display 408 of a computer system (such as a system shown in one of the figures described herein above). The user selects ad 410 in image 404. In embodiments of the invention, the image does not have a hyperlink. Correspondingly, selecting a portion of the image, such as the ad, does not involve selecting a hyperlink. Selecting is further described herein below.

Responsive to the user selection of the ad, the user is directed by the computer system to second place 406 that corresponds with ad 410. For example, the user is directed to a McDonald's fast food outlet location that is the closest one to first place 406, if ad 410 in image 404 of first place 406 has golden arches. Or, for example, the user is directed to the nearest electronics store that carries a particular model of phone, if ad 410 depicts that particular model.

It should be understood that one or more implementations herein are not necessarily dependent upon the user being physically at any particular geographic location, nor upon the user having access to or being equipped with a GPS device, nor upon the user designating, for either the first or second geographic location, target coordinates or a street address or the like to the computer system. That is, the user may simply be browsing a street-level representation of the world 414 via a user interface of the computer system.

It is well known for a computer to present a user with an ad in a browser when the user is browsing web pages. This may be done by a web page server selecting the ad or by the user's client computer system selecting the ad and may be done by the server or client responsive to a particular web page, a tag associated with information on the web page, the user's browsing history, information about the user, etc. This is different than what is described herein for an embodiment of the present invention. In one instance herein, the user selects ad 410 that actually exists at first place 406 in the world and that is shown in image 404 of that place 406. In an embodiment of the present invention, no information about image 404 or ad 410 has been prepared in advance for a computer system in advance of the user navigating to image 404 or ad 410.

In one instance herein, ad 410, which is a real-world first image 404 in first location 406, is enabled to essentially act as a pointer for the user to second location 412 having some meaning to the user, where the user selected real-world ad 410 so that a processing module of the computer can derive meaning from that user selection. Further, the processing module can compute an underlying meaning of real-world ad 410 without the necessity of reference to meta-data having been embedded in ad 410 or image 404 or elsewhere on the web. That is, at the time the user navigates to real-world ad 410 or image 404, no predetermined meaning has been already associated with image 404 or ad 410 by a data structure or other computer readable fashion, such as by prior association of a tag or other meta-data with image 404, ad 410, or with a web page containing image 404 and ad 410.

In one alternative, the user selects advertisement 410 in image 404 of first location 406, image 404 is processed by a processing module of the computer system, and the user is directed by the computer system to second location 412 that has a logical connection to ad 410. More generally speaking, the user selects a portion of first image 404 for a first location 406 and the user is directed by the computer system to a second location responsive to processing of image 404.

Figure 4B:
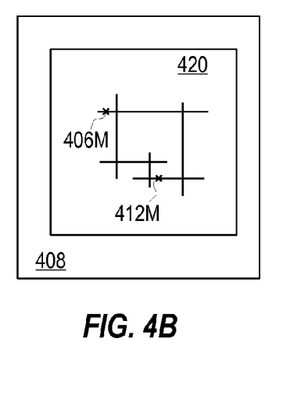
FIG. 4B depicts the computer system directing the user to second location, according to an embodiment of the invention.
Figure 4C:
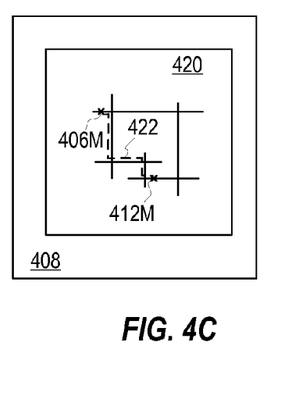
FIG. 4C depicts the computer system displaying a route from a first to a second location, according to an embodiment of the invention.
Figure 4D:
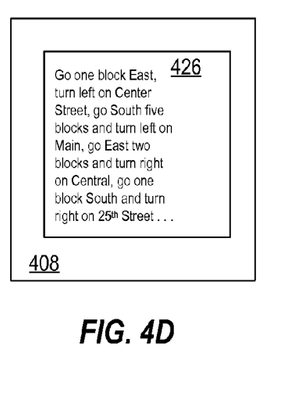
FIG. 4D depicts the computer system displaying a description of a route, according to an embodiment of the invention.

Referring now to FIG. 4B, in one instance, directing the user to second location 412 includes display 408 showing a representation 412M of the second location on map 420. In an instance shown in FIG. 4C, this includes display 408 graphically showing a route 422 from map 420 representation 406M of first location 406 to map 420 representation 412M of second location 412 the route on a map. In an instance shown in FIG. 4D, this includes display 408 showing a text-based description 426 of a route like route 422 shown in FIG. 4C. In various instances, display 408 may show various combinations of any or all of what is shown in FIGS. 4B-4D.

One or more embodiments of the invention have been shown in FIGS. 4A-4D relating to an ad shown in an image. It should also be understood that embodiments of the invention are also applicable for non-ad related information shown in an image of a first place. For example, an image like image 404 of FIG. 4 may include a sign instead of an ad, where the sign has text indicating a place is located in a given direction, where the place may be a park, building, parking lot, street, highway, transportation facility, city or the like. Therefore, stating an embodiment of the invention more generally, in one instance a computing device presents an image of a first geographic place to a user and receives a user selection of a portion of the image. In an alternative, the image includes a sign and the user-selected portion of the image may be a portion of the image that bounds the sign or some text of the sign. A processing module processes the user-selected image portion and responsively identifies and presents information to the user identifying a second geographic place for which the processing module computes a logical connection to the user-selected portion of the image of the first place. That is, for example, the processing module presents information to the user identifying a second place that is a park, building, parking lot, street, highway, transportation facility, city or the like described in the sign.

Figure 5A:
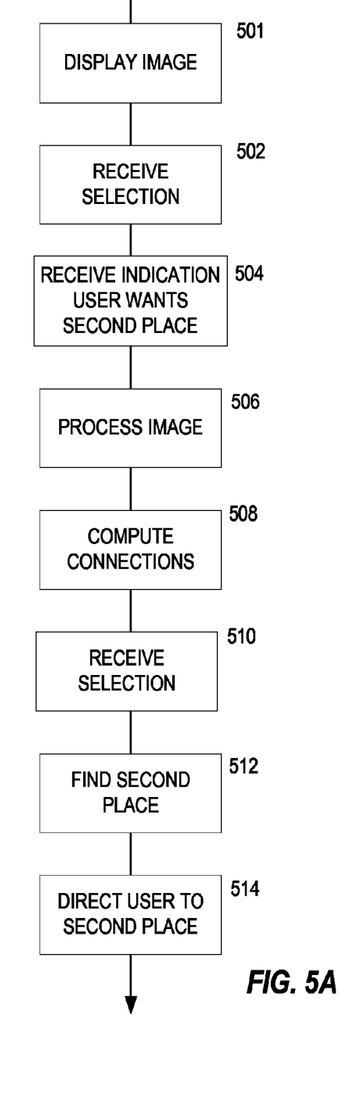
FIGS. 5A-5G depict flowcharts of representative processes used in an embodiment of the invention.

FIG. 5A is a flowchart of a representative process 500, according to an embodiment of the invention. The process arises from execution of instructions residing in one or more processing modules of at least one computer system, such as described herein above.

Process 500 starts when an image of a first place is displayed (501). Then (502), process 500 receives a user selection of a portion of the image, e.g., a portion such as a sign or a portion of a sign having text or graphics.

Figure 5B:
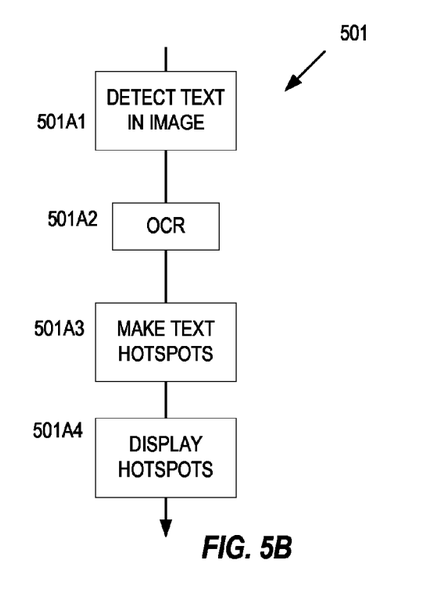

Referring to FIG. 5B in addition to FIG. 5A, in one embodiment of the invention subprocess (501) includes preprocessing (501A) before user selection (502). Subprocess (501A) first detects text in the image (501A1) then assigns text characters via an optical character recognition subprocess (501A2). Then subprocess (501A) generates hotspots (501A3) for the areas that contain text and highlights them (501A4).

Figure 5C:
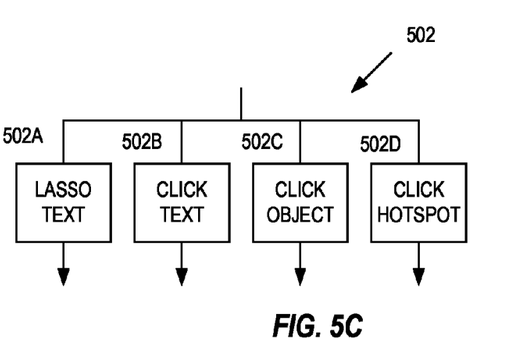

Referring to FIG. 5C in addition to FIG. 5A, the user selection (502) of an image portion may be carried out in various ways. In one way, user selection subprocess (502) receives user input for a lasso tool (502A) via an input device such as mouse, track pad, track ball, arrow keys, etc. The user input guides the tool to lasso a portion of the image. In another way, user selection subprocess (502) receives a cursor position input from the user via the input device and automatically generates a circle around the cursor, the size of which is controlled by user input. User selection subprocess (502) receives an input device button click (502B) from the user, once the user is satisfied the circle location defines the desired portion of the image. In another way, user selection subprocess (502) receives the cursor position input from the user via the input device and automatically detects nearby text by invoking an optical character recognition subprocess, if the subprocess receives user selection of a "text" option (502B), or else automatically detects borders of an object that is indicated by the cursor by invoking a graphic object recognition subprocess, if the subprocess receives user selection an "object" option (502C). In another way, if preprocessing 501A had been carried out (FIG. 5B), subprocess (502) receives user selection (502D) of a hotspot by user manipulation of the input device.

Next, in FIG. 5A process 500 next (504) receives a selection from the user indicating whether the user wants to see a second place suggested by an underlying meaning of the user-selected portion of the image. If yes (506), then process 500 next processes the image to identify a meaning for the user-selected image portion.

Figures 5D, 5E, 5G:
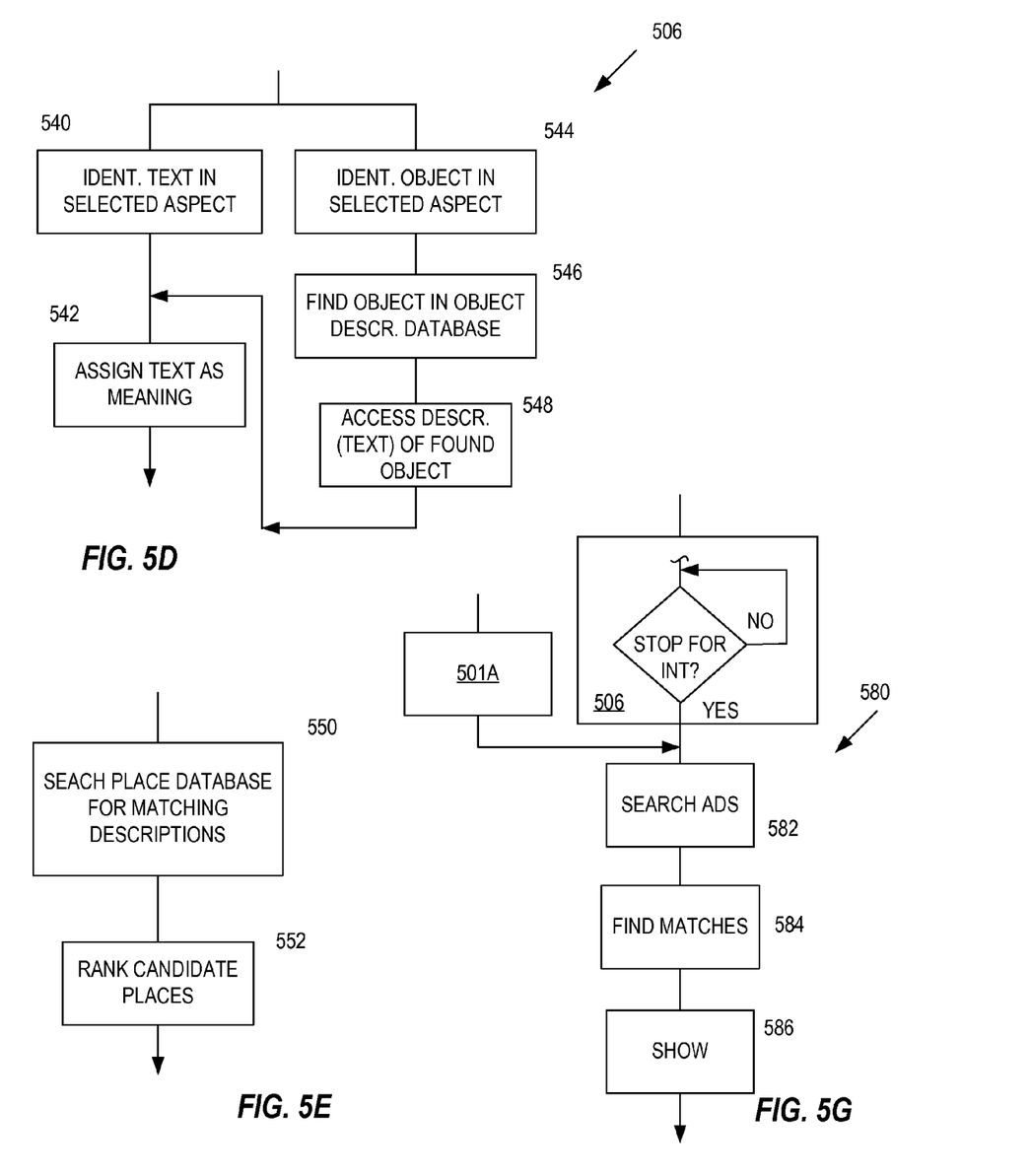

Referring to FIG. 5D in addition to FIG. 5A, in one embodiment of the invention, processing (506) to identify a meaning includes identifying text in the user-selected portion of the image by an optical character recognition subprocess. For example, the text could be the name of a place to eat, such as "McDonalds," or it could be the name of a type of food, such as "burgers," or it could be the name of a building or other facility, such as "train station," etc. Optionally, processing (506) may facilitate optical character recognition by finding an enlarged image of the sign, an image taken from a closer vantage, if this is available.

In one embodiment of the invention, identifying a meaning includes processing subprocess (506) identifying an object within the user-selected portion of the image by an object recognition process. For example, the image could be of golden arches, or a burger, or a depiction of the Eiffel Tower, etc. In such an embodiment, identifying a meaning also includes processing subprocess (506) next searching for a description of the object in an object description database and identifying text for a matching description responsive to the searching. For example, the text could "McDonalds," if the image is golden arches, or it could be "burgers," if the image is of burgers, or it could be "train station" if the image is of a well-known metro symbol, etc.

In one embodiment of the present invention, the object description database includes a database of registered trademarks, which is a publically available database that has graphic objects and information that includes graphic objects that have commercial significance and that are widely used on city streets. This database depicts graphic trademarks and includes a description of the goods and services associated with each trademark and the identity of each owner. For particular situations, the trademark database may be particularly useful. For example, if the user-selected portion of an image is a trademark graphic object that means "Rolex" or text that says "Rolex," and the image has no associated watch image, this may be a problem for determining a meaning for which there will be a logical connection to a place, because this is a name for which there may be no sales outlet listed in a telephone directory yellow pages. In this kind of instance, identifying a meaning may include subprocess (506) searching for "Rolex" in the trademark registration database, then reading "watches" in the goods and services field of the "Rolex" trademark registration record.

In one embodiment of the invention, identifying a meaning includes processing subprocess (506) identifying text (e.g., "burger") and identifying an object (e.g., image of golden arches) and the finding additional text for the object (e.g., "McDonalds") as described above.

Next, in FIG. 5A process 500 then (508) computes a logical connection between the meaning and candidate second places. In other words, process 500 identifies second places based on a identifying a logical connection between second places and the meaning identified in processing (506) the image of the first place.

Referring to FIG. 5E in addition to FIG. 5A, in one embodiment of the invention, this includes subprocess 508 performing a computation in which it identifies candidate second places by searching for a place in a database and finding places in a place location and description database, where the places each have a significance that matches the meaning identified in processing (506) the image portion of the first place. The "logical connection" in this instance includes the match between the significance of the second place and the meaning identified for the image portion of the first place.

The place database identifies places and their locations and associates logical significance to the respective places. The logical significance stored in the database for a place may be extensive or simple. For example, in one database record, a place may be identified as a library branch and described as having a particular name. In an instance with a more extensively describe logical significance, the database description states that the library branch has a particular name and particular hours of operation. In one instance, a place is described as a restaurant having a particular name, (and possibly having a brand/trademark association) that serves a particular kind of food in a particular price range. One place is a parking garage that is free after 6 pm.

In one instance, the second place (i.e., geographic location) includes a retail outlet, wherein the user-selected portion of the first place's image is an advertisement and the logical connection between the ad and the second place includes a logical connection wherein the outlet sells goods or services corresponding to the ad. In a further instance, selling goods or services corresponding to the ad includes selling goods or services from a source associated with a trademark in the ad.

For an instance in which processing the image (506) identifies text such as, for example, "McDonalds," or "burgers," or "train station," etc., then in one instance computing (508) the logical connection between the user-selected image portion, such as an ad, and the second geographic location includes searching a database for commercial and governmental places relating to the identified text, for example, finding a McDonalds restaurant, or a place to eat a burger, or a train station, depending on the text identified by meaning subprocess (506). The database, in one instance, may include a telephone directory.

In an additional feature, according to an embodiment of the invention, process 500 ranks the second locations and presents them to the user by rank, which may be controlled by the user. In one instance a single, highest ranked second location is presented. In other instances, a number of second locations are presented, such as the top five, depending upon the particular embodiment of the invention.

One way process 500 ranks is by proximity to the first place, which may be relative to other candidate second places. In one instance, a highest ranking second place is of a particular type that matches the identified meaning of the first place's user selected image portion and is the closest location of its type to the place.

One way process 500 identifies "closest," in an embodiment of the invention, is by process 500 selecting a direction and considering second locations that are oriented in that direction from the first location. In one instance, this includes process 500 receiving a user input, wherein the user indicates the direction. In one instance, this includes process 500 automatically determining the direction based on orientation of the first image. That is, if the image depicts a North facing orientation (i.e., orientation of the camera that captured the image), then process 500 considers only second locations that are North of the first location. (In one instance, process considers directions other than the selected direction, but ranks highest those locations that are in the selected direction.)

In one instance, selecting a direction includes process 500 automatically determining the direction based on a road. Since a road may turn and take a traveler in a different direction than an initial direction, this can result in process 500 considering locations that are along the road but not necessarily in the same direction as an initial direction, depending on the road. That is, in this embodiment of the invention, process 500 determines a road for selecting the direction. In one instance, process 500 does this by requesting that the user identify the road, such as by displaying a map to the user and having the user touch a road on the map and dragging a cursor in a particular direction along the road or by orienting an icon to face a selected direction. In one instance, process 500 may select a direction automatically, particularly in a case where the first image portion selected by the user includes a sign along a road and oriented in a direction of travel along the road. In this case, process 500 automatically determines direction based on that direction of travel on that road. That is, in this case process 500 automatically finds second places that are along the road in the direction of travel.

Next, in FIG. 5A process 500 receives user selection of one of the candidate second places. Then process 500 finds (510) the selected second place in a representation of the real world, such as on a map. Then process 500 directs (512) the user to the second place.

Figure 5F:
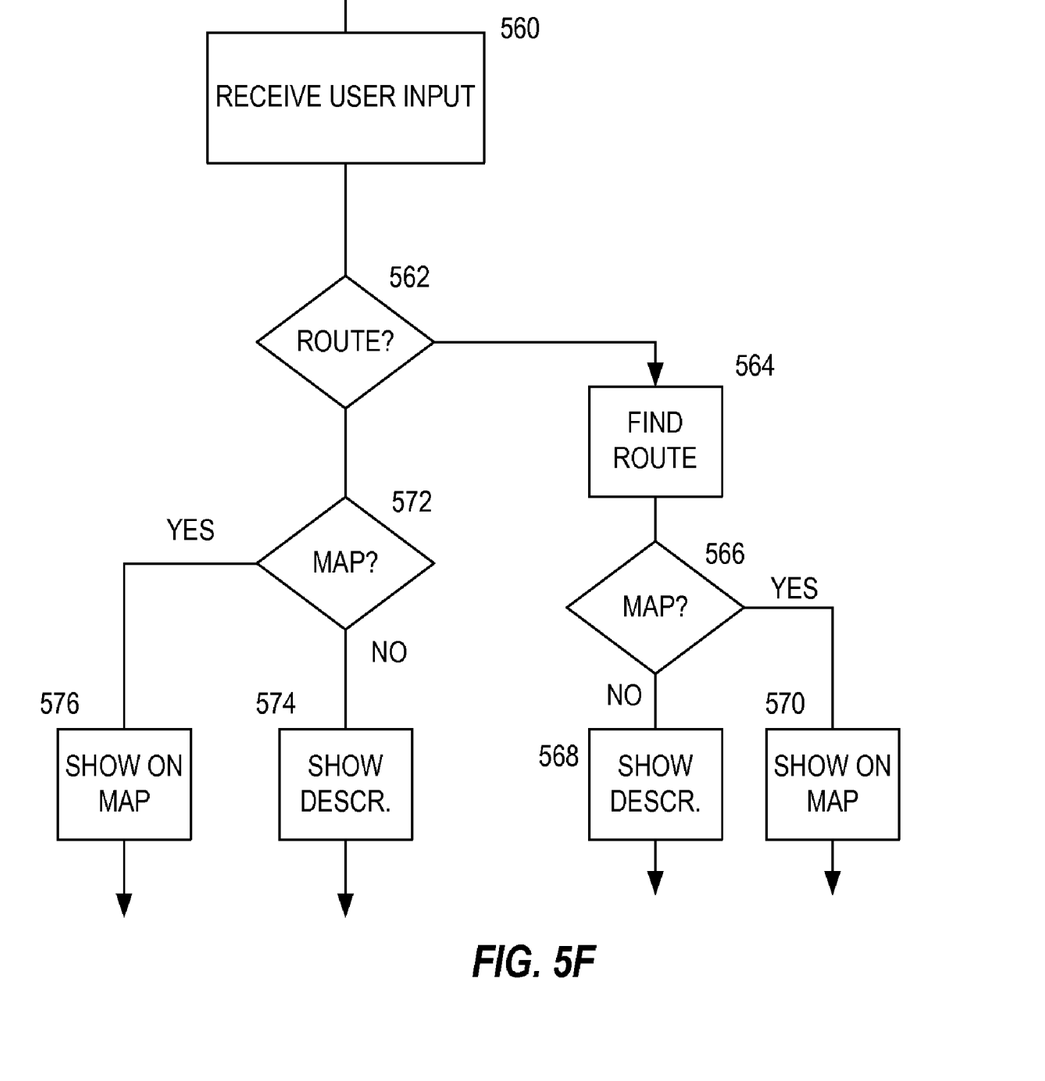

Referring to FIG. 5F in addition to FIG. 5A, in one embodiment of the invention process 500 directs (514) the user to the selected second place, which includes receiving (560) a user selection indicating what information the user wants about the second place, i.e., how the user wants the second place to be presented. Responsive to the received selection indicating that the user wants a route (562, yes selection), process 500 finds the route (564) from the first place to the second place. Then, responsive to the received selection indicating that the user does not want the route as a map (566, no), i.e., that the user wants the route as a text based description, process 500 presents a word-based description of the route (568). Otherwise, responsive to the received selection indicating that the user does want the route as a map (566, yes), process 500 generates and presents a graphic depiction (570) of the route on a map.

Responsive to the received selection (562) indicating that the user does not want a route (562, no), and determines user wants a map (572, yes), process 500 generates and shows a representation of the second place on a map (576). If process 500 determines from the received selection that the user does not want a route (562, no), and determines user does not want a map (572, no), process 500 generates and presents (574) to the user a word based description of the second place. Referring to FIG. 5G in addition to FIG. 5A, in an embodiment of the invention once processing (506) of process 500 determines a meaning for an area of an image, process 500 generates one or more advertisements that have a logical connection to the meaning and presents the one or more ads to the user. In one instance, if a user is scrolling through street view images and selects an image portion for processing (506), once meaning processing (506) determines a meaning for the selected portion, it invokes ad generating subprocess (580), which searches (582) ads for goods or services in a database, matches (584) one or more ads to the meaning and generates and shows (586) one or more of the matching advertisements to the user. In one instance, if a user merely stops on an image for more than a predetermined interval, once meaning preprocessing (501A, FIG. 5B) determines meaning of text throughout the image it invokes ad generating subprocess (580).

Figure 6:
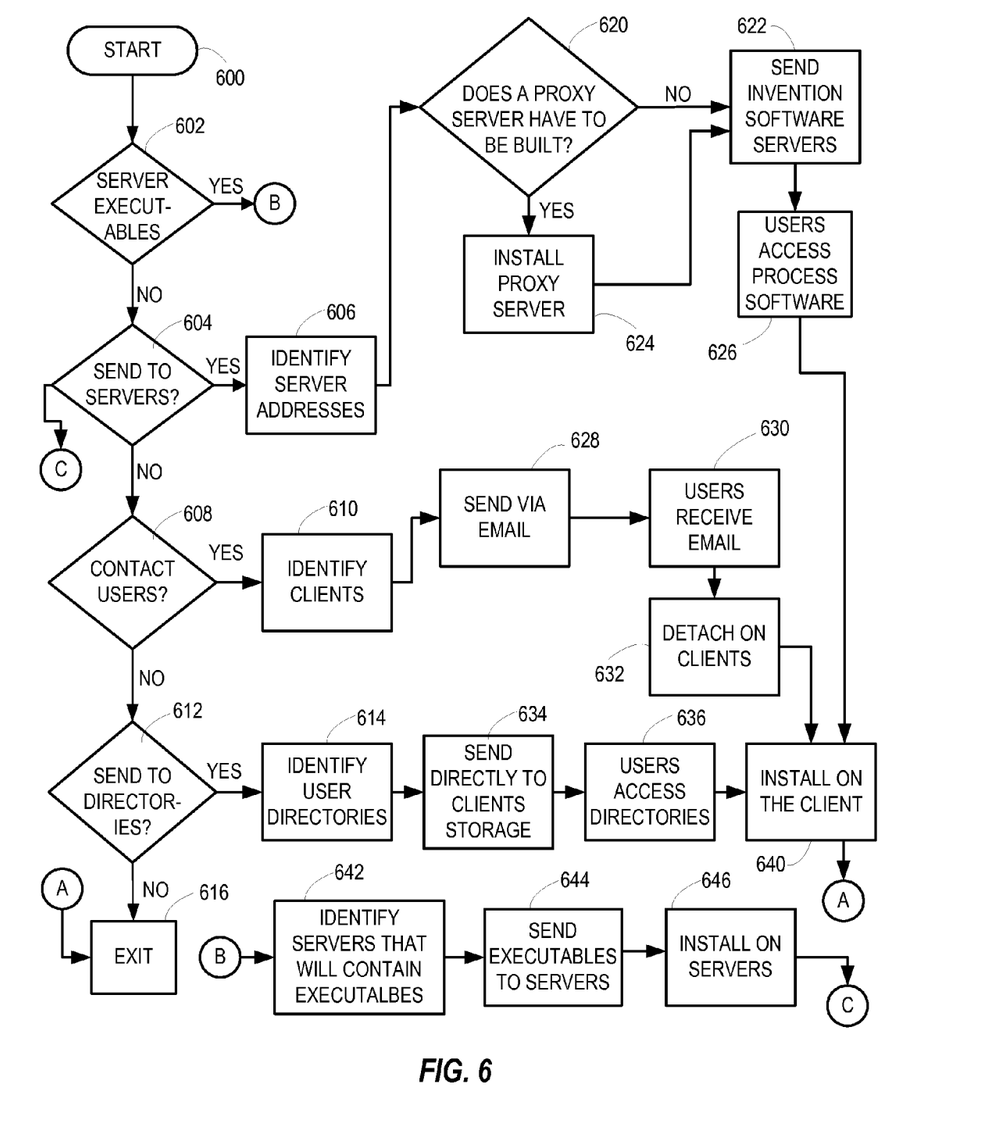
FIG. 6 depicts a flowchart of a representative process for software deployment used in an embodiment of the invention.

FIG. 6 depicts a flowchart of a deployment of a software process that includes an embodiment of the present invention. Step 600 begins the deployment software process. The first thing is to determine if there are any programs that will reside on a server or servers when the process software is executed 602. If this is the case then the servers that will contain the executables are identified 642. The process software for the server or servers is transferred directly to the servers' storage via FTP or some other protocol or by copying through the use of a shared file system 644. The software process is then installed on the servers 646.

Next, a determination is made on whether the software process is to be deployed by having users access the software process on a server or servers 604. If the users are to access the software process on servers then the server addresses that will store the invention are identified 606. A determination is made as to whether a proxy server is to be built 620 to store the software process. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 624.

The software process is sent to the servers either via a protocol such as FTP or it is copied directly from the source files to the server files via file sharing 622. Another embodiment would be to send a transaction to the servers that contained the software process and have the server process the transaction, then receive and copy the software process to the server's file system. Once the software process is stored at the servers, the users via their client computers, then access the software process on the servers and copy to their client computers file systems 626. Another embodiment is to have the servers automatically copy the process software to each client and then run the installation program for the process software at each client computer. The user executes the program that installs the software process on his client computer 640 then exits the process 616.

In step 608 a determination is made as to whether the software process is to be deployed by sending the software process to users via e-mail. The set of users where the software process will be deployed are identified together with the addresses of the user client computers 610. The process software is sent via e-mail to each of the users' client computers in step 628. The users then receive the e-mail 630 and then detach the process software from the e-mail to a directory on their client computers 632. The user executes the program that installs the process software on his client computer 640 then exits the process 616.

Lastly a determination is made on whether the process software will be sent directly to user directories on their client computers 612. If so, the user directories are identified 614. The process software is transferred directly to the user's client computer directory 634. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 636. The user executes the program that installs the process software on his client computer 640 then exits the process 616.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
displaying a non-hyperlinked, real-world image of a first geographic location by a computer system;
receiving, by the computer system, a user selection of a portion of the image of the first geographic location;
processing the user-selected image portion by the computer system to identify a meaning for the user-selected image portion, wherein identifying the meaning includes i) the computer system identifying an object in the user selected image portion and finding a matching description of the object in a database or ii) identifying text in the user selected image portion;
the computer system computing a logical connection between the computer system identified meaning and a second geographic location, wherein the logical connection is a logical connection more than or other than proximity of the second geographic location to the first location; and
the computer system providing directions to the second geographic location responsive to the computed logical connection.

2. The method of claim 1, wherein computing the logical connection includes finding a match between a significance of the second geographic location and the text or description of the user-selected image portion.

3. The method of claim 2, wherein receiving a user selection of an image portion includes receiving a user selection identifying an ad within the image and wherein the processing to identify a meaning for the user-selected image portion includes identifying a meaning for the ad.

4. The method of claim 3, wherein processing the image to identify a meaning for the ad includes:
the computer system recognizing text in the user selected image portion; and wherein computing the logical connection between the user-selected ad and the second geographic location includes:
the computer system searching a database for commercial outlets relating to the recognized text and searching among the commercial outlets relating to the recognized text for one located nearest to the first location.

5. The method of claim 3, wherein the processing to identify a meaning for the ad includes:
the computer system identifying an object in the user selected image portion;
the computer system searching for a matching description of the object in a database; and
identifying text for the matching description responsive to the searching; and wherein computing the logical connection includes:
the computer system searching a database for commercial outlets relating to the identified text and searching among the commercial outlets relating to the identified text for one located nearest to the first location.

6. The method of claim 3, wherein the second geographic location includes a retail outlet, wherein the logical connection includes a connection wherein the outlet sells goods or services corresponding to the ad.

7. The method of claim 6, wherein selling goods or services corresponding to the ad includes selling goods or services from a source associated with a trademark in the ad.

8. The method of claim 1, wherein providing directions to the second geographic location includes identifying the second geographic location on a map.

9. The method of claim 1, wherein providing directions to the second geographic location includes providing a text-based description of a route from the first geographic location to the second geographic location.

10. The method of claim 1, wherein providing directions to the second geographic location includes graphically showing a route on a map from the first location to the second geographic location.

11. The method of claim 1, wherein the image includes a panoramic street-level image of city street surroundings.

12. A program product for exploring or navigating via images, the program product comprising:
a computer readable storage medium having computer readable program code embodied therewith, the computer readable program code comprising:
computer readable code configured to receive a user selection of a portion of a non-hyperlinked, real-world image of a first geographic location;
computer readable code configured to process the image to identify a meaning for the user-selected image portion, wherein identifying the meaning includes i) the computer system identifying an object in the user selected image portion and finding a matching description of the object in a database or ii) identifying text in the user selected image portion;
computer readable code configured to compute a logical connection between the meaning and a second geographic location, wherein the logical connection is a logical connection more than or other than proximity of the second geographic location to the first location; and
computer readable code configured to direct the user to the second geographic location responsive to the computed logical connection.

13. The program product of claim 12, wherein computing the logical connection includes finding a match between a significance of the second geographic location and the text or description of the user-selected image portion.

14. The program product of claim 13, wherein receiving a user selection of an image portion includes receiving a user selection identifying an ad within the image and wherein processing the image to identify a meaning for the user-selected image portion includes identifying a meaning for the ad.

15. The program product of claim 14, wherein processing the image to identify a meaning for the ad includes:
recognizing text in the user selected image portion; and wherein computing the logical connection between the user-selected ad and the second geographic location includes:
searching a database for commercial outlets relating to the recognized text and searching among the commercial outlets relating to the identified text for one located nearest to the first location.

16. The program product of claim 14, wherein processing the image to identify a meaning for the ad includes:
identifying an object in the user selected image portion;
searching for a matching description of the object in a database; and
identifying text for the matching description responsive to the searching; and wherein computing the logical connection includes:
searching a database for commercial outlets relating to the identified text and searching among the commercial outlets relating to the identified text for one located nearest to the first location.

17. The program product of claim 14, wherein the second geographic location includes a retail outlet, wherein the logical connection includes a connection wherein the outlet sells goods or services corresponding to the ad.

18. The program product of claim 17, wherein selling goods or services corresponding to the ad includes selling goods or services from a source associated with a trademark in the ad.

19. A computer system comprising:
at least one storage system for storing a program; and
at least one processor for processing the program, the system being configured with the program and the processor to receive a user selection of a portion of a non-hyperlinked, real-world image of a first geographic location, process the image to identify a meaning for the user-selected image portion, wherein identifying the meaning includes i) the computer system identifying an object in the user selected image portion and finding a matching description of the object in a database or ii) identifying text in the user selected image portion, compute a logical connection between the user-selected image portion and a second geographic location, wherein the logical connection is a logical connection more than or other than proximity of the second geographic location to the first location, and direct the user to the second geographic location responsive to the computed logical connection.

20. The computer system of claim 19, wherein computing the logical connection includes finding a match between a significance of the second geographic location and the text or description of the user-selected image portion.

21. The computer system of claim 20, wherein receiving a user selection of an image portion includes receiving a user selection identifying an ad within the image and wherein processing the image to identify a meaning for the user-selected image portion includes identifying a meaning for the ad.

22. The computer system of claim 21, wherein processing the image to identify a meaning for the ad includes:
recognizing text in the user selected image portion; and wherein computing the logical connection between the user-selected ad and the second geographic location includes:
searching a database for commercial outlets relating to the recognized text and searching among the commercial outlets relating to the identified text for one located nearest to the first location.

23. The computer system of claim 21, wherein processing the image to identify a meaning for the ad includes:
identifying an object in the user selected image portion;
searching for a matching description of the object in a database; and
identifying text for the matching description responsive to the searching; and wherein computing the logical connection includes:
searching a database for commercial outlets relating to the identified text and searching among the commercial outlets relating to the identified text for one located nearest to the first location.

24. The computer system of claim 21, wherein the second geographic location includes a retail outlet, wherein the logical connection includes a connection wherein the outlet sells goods or services corresponding to the ad.

25. The computer system of claim 24, wherein selling goods or services corresponding to the ad includes selling goods or services from a source associated with a trademark in the ad.

* * * * *